(12) United States Patent
Nakagawa et al.

(10) Patent No.: US 11,393,493 B1
(45) Date of Patent: Jul. 19, 2022

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tomoyuki Maeda, Kawasaki (JP); Tazumi Nagasawa, Yokohama (JP); Hitoshi Iwasaki, Nerima (JP); Hirofumi Suto, Ota (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/398,385

(22) Filed: Aug. 10, 2021

(30) Foreign Application Priority Data

Feb. 12, 2021 (JP) .............................. JP2021-020441

(51) Int. Cl.
*G11B 5/31* (2006.01)
*G11B 5/193* (2006.01)
(Continued)

(52) U.S. Cl.
CPC .......... *G11B 5/3146* (2013.01); *G11B 5/1278* (2013.01); *G11B 5/193* (2013.01); *G11B 2005/0005* (2013.01)

(58) Field of Classification Search
None
See application file for complete search history.

(56) References Cited

U.S. PATENT DOCUMENTS

| 8,345,380 B2 | 1/2013 | Sato et al. |
| 2008/0019040 A1 | 1/2008 | Zhu et al. |

(Continued)

FOREIGN PATENT DOCUMENTS

| JP | 2008-277586 A | 11/2008 |
| JP | 2008-305486 A | 12/2008 |

(Continued)

OTHER PUBLICATIONS

Matsubara et al., "Experimental feasibility of spin-torque oscillator with synthetic field generation layer for microwave assisted magnetic recording" Journal of Applied Physics 109, 07B741 (2011), Oct. 12, 2010 https://doi.org/10.1063/1.3559539, 4 pages.

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic recording head includes a first magnetic pole, a second magnetic pole, and a stacked body provided between the first magnetic pole and the second magnetic pole. The stacked body includes a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, and a third non-magnetic layer provided between the first magnetic pole and the first magnetic layer. The first magnetic layer includes a first element including at least one of Fe, Co, or Ni. The second magnetic layer includes the first element, and a second element including at least one selected from the group consisting of Cr, V, Mn, Ti, and Sc.

20 Claims, 10 Drawing Sheets

(51) Int. Cl.
*G11B 5/127* (2006.01)
*G11B 5/00* (2006.01)

(56) References Cited

U.S. PATENT DOCUMENTS

| | | |
|---|---|---|
| 2008/0268291 A1 | 10/2008 | Akiyama et al. |
| 2008/0304176 A1 | 12/2008 | Takagishi et al. |
| 2011/0279921 A1* | 11/2011 | Zhang .................. G11C 11/161 360/59 |
| 2012/0134054 A1* | 5/2012 | Takeo .................. G11B 5/3146 360/234.3 |
| 2012/0176702 A1 | 7/2012 | Yamada et al. |
| 2015/0187375 A1* | 7/2015 | Zhang .................. G11C 11/1673 428/812 |

FOREIGN PATENT DOCUMENTS

| | | | | |
|---|---|---|---|---|
| JP | 2012-146351 A | | 8/2012 | |
| JP | 2014010871 A | * | 1/2014 | ............. G11B 5/127 |

* cited by examiner

MAGNETIC HEAD AND MAGNETIC RECORDING DEVICE

CROSS-REFERENCE TO RELATED APPLICATIONS

This application is based upon and claims the benefit of priority from Japanese Patent Application No. 2021-020441, filed on Feb. 12, 2021; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1A:
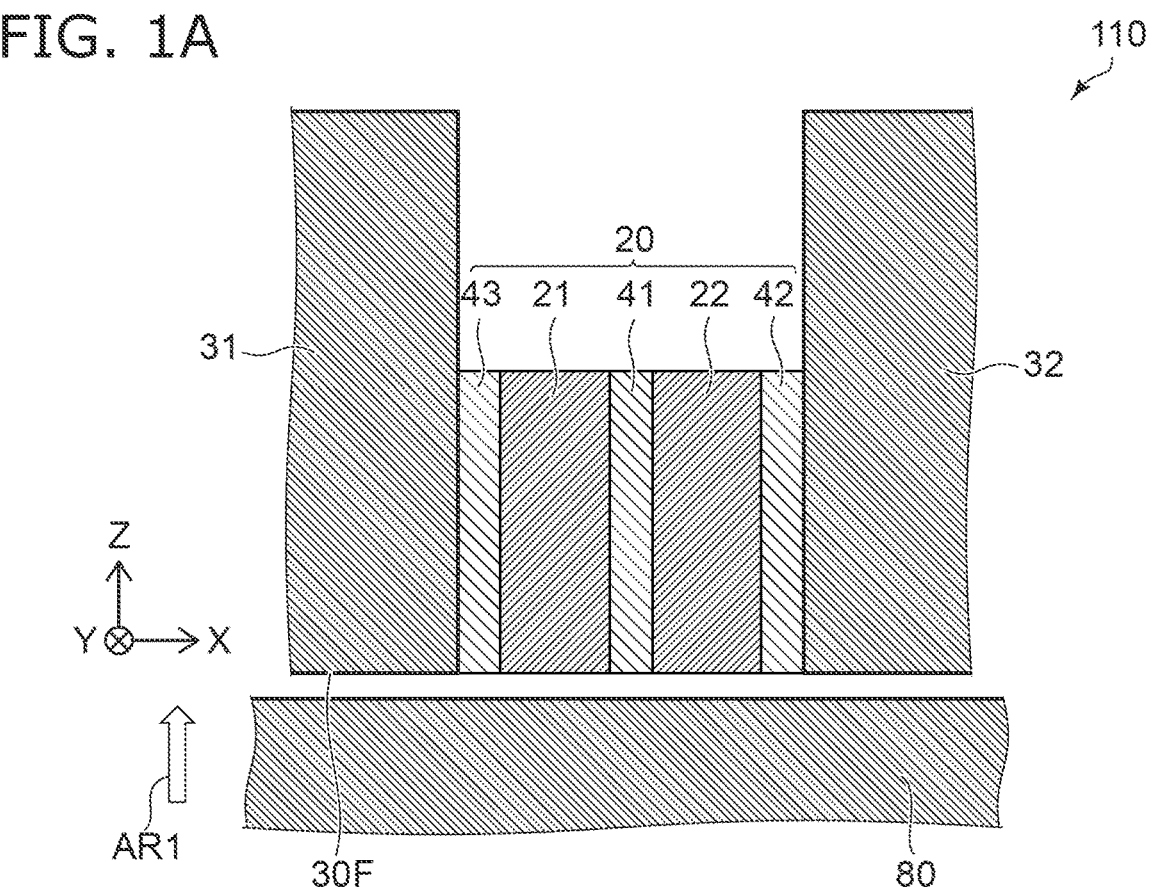
FIGS. 1A and 1B are schematic views illustrating a magnetic head according to a first embodiment.

According to one embodiment, a magnetic recording head includes a first magnetic pole, a second magnetic pole, and a stacked body provided between the first magnetic pole and the second magnetic pole. The stacked body includes a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, and a third non-magnetic layer provided between the first magnetic pole and the first magnetic layer. The first magnetic layer includes a first element including at least one of Fe, Co, or Ni. The second magnetic layer includes the first element, and a second element including at least one selected from the group consisting of Cr, V, Mn, Ti, and Sc. The first magnetic layer does not include the second element, or a concentration of the second element in the first magnetic layer is lower than a concentration of the second element in the second magnetic layer. A first thickness of the first magnetic layer along a first direction from the first magnetic pole toward the second magnetic pole is not less than 0.25 times and not more than 4 times a second thickness of the second magnetic layer along the first direction.

According to one embodiment, a magnetic recording device includes the magnetic head described above, and an electric circuit. The electric circuit is configured to supply a current to the stacked body. The current has a direction from the first magnetic layer toward the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
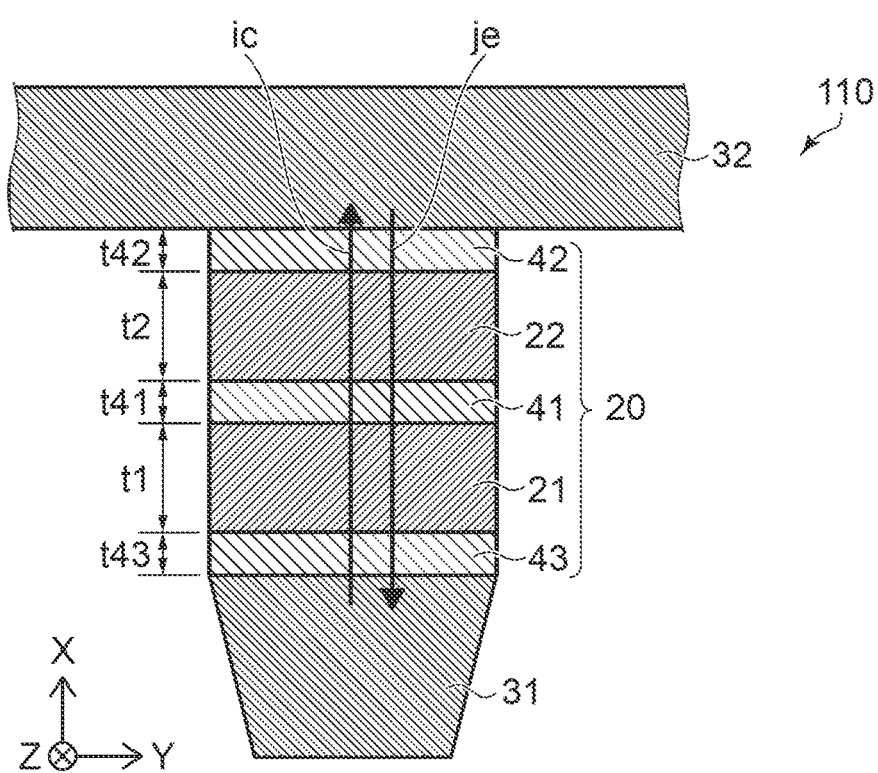

FIGS. 1A and 1B are schematic views illustrating a magnetic head according to a first embodiment FIG. 1A is a cross-sectional view. FIG. 1B is a plan view viewed in a direction of an arrow AR1 of FIG. 1A.

Figure 2:
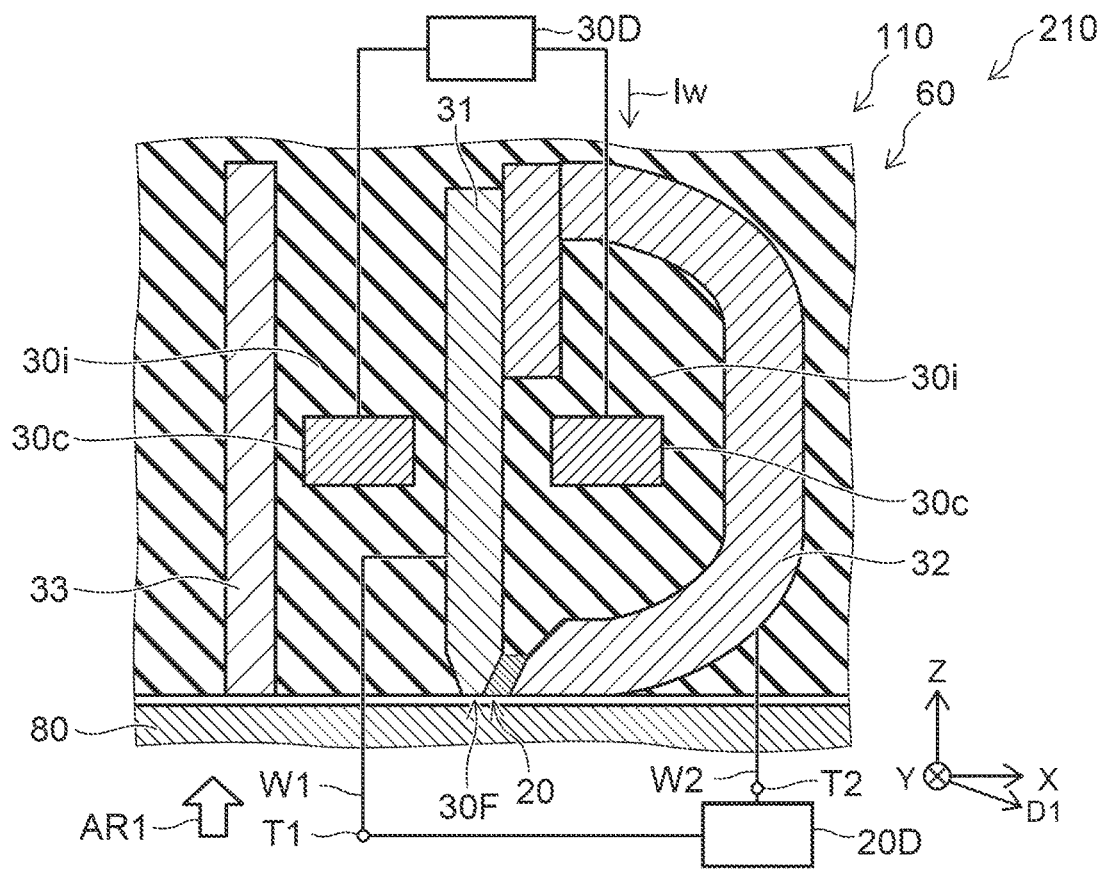
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, a magnetic recording device 210 according to the embodiment includes a magnetic head 110 and an electric circuit 20D. The magnetic recording device 210 may include a magnetic recording medium 80. At least the recording operation is performed in the magnetic recording device 210. In the recording operation, information is recorded on the magnetic recording medium 80 using the magnetic head 110.

The magnetic head 110 includes a recording part 60. As will be described later, the magnetic head 110 may include a reproducing part. The recording unit 60 includes a first magnetic pole 31, a second magnetic pole 32, and a stacked body 20. The stacked body 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield.

The direction from the magnetic recording medium 80 toward the magnetic head 110 is taken as a Z-axis direction. One direction perpendicular to the Z-axis direction is taken as an X-axis direction. The direction perpendicular to the Z-axis direction and the X-axis direction is taken as a Y-axis direction. The Z-axis direction corresponds to, for example, a height direction. The X-axis direction corresponds to, for example, a down track direction. The Y-axis direction corresponds to, for example, a cross-track direction. The magnetic recording medium 80 and the magnetic head 110 move relatively along the down track direction. A magnetic field (recording magnetic field) generated from the magnetic head 110 is applied to a desired position of the magnetic recording medium 80. The magnetization of the magnetic recording medium 80 at a desired position is controlled in a direction corresponding to the recording magnetic field. As a result, information is recorded on the magnetic recording medium 80.

The direction from the first magnetic pole 31 toward the second magnetic pole 32 is taken as a first direction D1. The first direction D1 substantially follows the X-axis direction. In the embodiment, the first direction D1 may be inclined at a small angle with respect to the X-axis direction.

As shown in FIG. 2, a coil 30c is provided. In this example, a portion of the coil 30c is between the first magnetic pole 31 and the second magnetic pole 32. In this example, a shield 33 is provided. In the X-axis direction, there is the first magnetic pole 31 between the shield 33 and the second magnetic pole 32. Another portion of the coil 30c is between the shield 33 and the first magnetic pole 31. An insulating portion 30i is provided between these multiple elements. The shield 33 is, for example, a leading shield. The magnetic head 110 may include a side shield (not shown).

As shown in FIG. 2, a recording current Iw is supplied to the coil 30c from a recording circuit 30D. A recording magnetic field corresponding to the recording current Iw is applied to the magnetic recording medium 80 from the first magnetic pole 31.

As shown in FIG. 2, the first magnetic pole 31 includes a medium facing surface 30F. The medium facing surface 30F is, for example, ABS (Air Bearing Surface). The medium facing surface 30F faces, for example, the magnetic recording medium 80. The medium facing surface 30F is, for example, along the XY plane.

As shown in FIG. 2, the electric circuit 20D is electrically connected to the stacked body 20. In this example, the stacked body 20 is electrically connected to the first magnetic pole 31 and the second magnetic pole 32. The magnetic head 110 is provided with a first terminal T1 and a second terminal T2. The first terminal T1 is electrically connected to the stacked body 20 via a first wiring W1 and the first magnetic pole 31. The second terminal T2 is electrically connected to the stacked body 20 via a second wiring W2 and the second magnetic pole 32. From the electric circuit 20D, for example, a current (for example, a direct current) is supplied to the stacked body 20.

As shown in FIGS. 1A and 1B, the stacked body 20 includes a first magnetic layer 21, a second magnetic layer 22, a third magnetic layer 23, a first non-magnetic layer 41, and a second non-magnetic layer 42, and a third non-magnetic layer 43. In FIGS. 1A and 1B, the insulating portion 30i is omitted.

The second magnetic layer 22 is provided between the first magnetic layer 21 and the second magnetic pole 32. The first non-magnetic layer 41 is provided between the first magnetic layer 21 and the second magnetic layer 22. The second non-magnetic layer 42 is provided between the second magnetic layer 22 and the second magnetic pole 32. The third non-magnetic layer 43 is provided between the first magnetic pole 31 and the first magnetic layer 21.

For example, the third non-magnetic layer 43 may be in contact with the first magnetic pole 31 and the first magnetic layer 21. The first non-magnetic layer 41 may be in contact with the first magnetic layer 21 and the second magnetic layer 22. The second non-magnetic layer 42 may be in contact with the second magnetic layer 22 and the second magnetic pole 32.

At least one of the first non-magnetic layer 41, the second non-magnetic layer 42, or the third non-magnetic layer 43 includes a third element. The third element includes, for example, at least one selected from the group consisting of Cu, Au, Cr, V, Al, and Ag. In a non-magnetic layer including such a material, for example, high spin transmittance can be obtained. For example, high oscillation strength can be obtained.

At least one of the second non-magnetic layer 42 or the third non-magnetic layer 43 may include a fourth element. The fourth element includes, for example, at least one selected from the group consisting of Ru, Jr, Ta, Rh, Pd, Pt, and W. In a non-magnetic layer including such a material, for example, low spin transmittance can be obtained. For example, stable oscillation can be easily obtained. At least one of the second non-magnetic layer 42 or the third non-magnetic layer 43 may include the above-mentioned third element and fourth element.

In the embodiment, the first magnetic layer 21 includes a first element. The first element includes at least one of Fe, Co, or Ni.

The second magnetic layer 22 includes the first element and a second element. The second element includes at least one selected from the group consisting of Cr, V, Mn, Ti, and Sc. The first magnetic layer 21 does not include the second element. Or, a concentration of the second element in the first magnetic layer 21 is lower than a concentration of the second element in the second magnetic layer 22.

For example, the concentration of the second element in the second magnetic layer 22 is not less than 10 atomic % and not more than 80 atomic %. The second magnetic layer 22 including such a material has, for example, negative spin polarization. On the other hand, for example, the first magnetic layer 21 has positive spin polarization.

As shown in FIG. 1B, a current ic is supplied to such a stacked body 20. The current ic is supplied from, for example, the electric circuit 20D described above. As shown in FIG. 1B, the current ic has a direction from the first magnetic layer 21 toward the second magnetic layer 22. As shown in FIG. 1B, an electron flow je accompanying the current ic has a direction from the second magnetic layer 22 toward the first magnetic layer 21.

For example, when the current ic equal to or higher than the threshold value flows through the laminated body 20, the magnetization of the magnetic layer included in the stacked body 20 oscillates. The stacked body 20 functions as, for example, an STO (Spin-Torque Oscillator). An alternating magnetic field (for example, a high frequency magnetic field) is generated from the stacked body 20 with the oscillation. The alternating magnetic field generated by the stacked body 20 is applied to the magnetic recording medium 80, and writing to the magnetic recording medium 80 is assisted. For example, MAMR (Microwave Assisted Magnetic Recording) can be performed.

In the magnetic head 110, the first magnetic layer 21 and the second magnetic layer 22 function as, for example, an oscillation layer. For example, the spin torque of negative transmission from the second magnetic layer 22 acts on the first magnetic layer 21. For example, the spin torque reflected by the first magnetic layer 21 acts on the second magnetic layer 22. For example, the magnetization of the first magnetic layer 21 and the magnetization of the second magnetic layer 22 rotate while interacting with each other.

As shown in FIG. 1B, the thickness of the first magnetic layer 21 along the first direction (direction from the first magnetic pole 31 to the second magnetic pole 32) is taken as a first thickness t1. The thickness of the second magnetic layer 22 along the first direction is taken as a second thickness t2. In the embodiment, for example, the first thickness t1 may be the same as the second thickness t2. This makes it easier to obtain oscillation, as will be described later.

The thickness of the first non-magnetic layer 41 along the first direction is taken as a thickness t41. The thickness of the second non-magnetic layer 42 along the first direction is taken as a thickness t42. The thickness of the third non-magnetic layer 43 along the first direction is taken as a thickness t43. These thicknesses are, for example, not less than 0.5 nm and not more 6 nm. When these thicknesses are not less than 0.5 nm, stable oscillation becomes easy. When these thicknesses are not more than 6 nm, for example, the spin transmittance tends to be high. For example, it is easy to obtain high oscillation intensity.

In the following, an example of simulation results regarding the behavior of oscillation in the stacked body 20 will be described. In the simulation model, the configuration shown in FIG. 1B is provided. That is, the first magnetic pole 31, the second magnetic pole 32, the first magnetic layer 21, the second magnetic layer 22, and the first to third non-magnetic layers 41 to 43 are provided. The oscillation characteristics of magnetization when the current is (current above the threshold value) illustrated in FIG. 1B is supplied is simulated. In the simulation model, the physical characteristic value of the $Fe_{70}Co_{30}$ alloy is used as the physical characteristic value of the first magnetic layer 21. The physical characteristic value of the $Fe_{70}Cr_{30}$ alloy is used as the physical characteristic value of the second magnetic layer 22. The physical characteristic value of Cu is used as the physical characteristic value of the first non-magnetic layer 41 and the third non-magnetic layer 43. The physical characteristic value of Ta is used as the physical characteristic value of the second non-magnetic layer 42. The thicknesses t41 to t43 are 2 nm.

Figure 3:
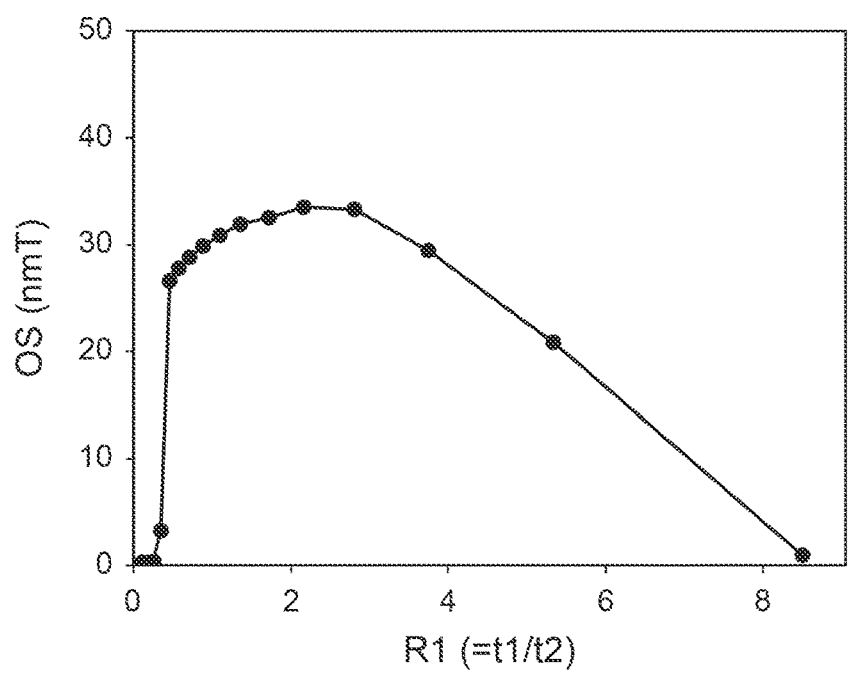
FIG. 3 is a graph view illustrating characteristics of the magnetic head.

FIG. 3 is a graph view illustrating characteristics of the magnetic head.

In the simulation illustrated in FIG. 3, a sum of the first thickness t1 of the first magnetic layer 21 and the second thickness t2 of the second magnetic layer 22 is kept constant at 19 nm, and a ratio of the first thickness t1 to the second thickness t2 is changed. The horizontal axis of FIG. 3 is a thickness ratio R1. The thickness ratio R1 is a ratio of the first thickness t1 to the second thickness t2 (that is, t1/t2). The vertical axis is oscillation strength OS. The oscillation strength OS is a sum of the product of the amplitude of the magnetization of the first magnetic layer 21 and the first thickness t1 and the product of the amplitude of the vibration of the magnetization of the second magnetic layer 22 and the second thickness t2. When the oscillation strength OS is high, for example, the recording density by MAMR is likely to be improved.

As shown in FIG. 3, when the thickness ratio R1 is close to 1, high oscillation strength OS can be obtained. For example, stable oscillation can be obtained when the thickness ratio R1 is not less than 0.25 and not more than 4. The thickness ratio R1 may be not less than 0.33. Higher oscillation strength OS can be obtained. The thickness ratio R1 may be not more than 3. Higher oscillation strength OS can be obtained.

In the embodiment, the first thickness t1 is preferably not less than 0.25 times and not more than 4 times the second thickness t2. As a result, the high oscillation strength OS can be obtained. Stable oscillation can be obtained. The first thickness t1 may be not less than 0.33 times and not more than 3 times of the second thickness. Higher oscillation strength OS can be obtained. More stable oscillation can be obtained. According to the embodiment, stable MAMR can be carried out. It is possible to provide a magnetic head which is possible to improve the recording density.

Figure 4A:
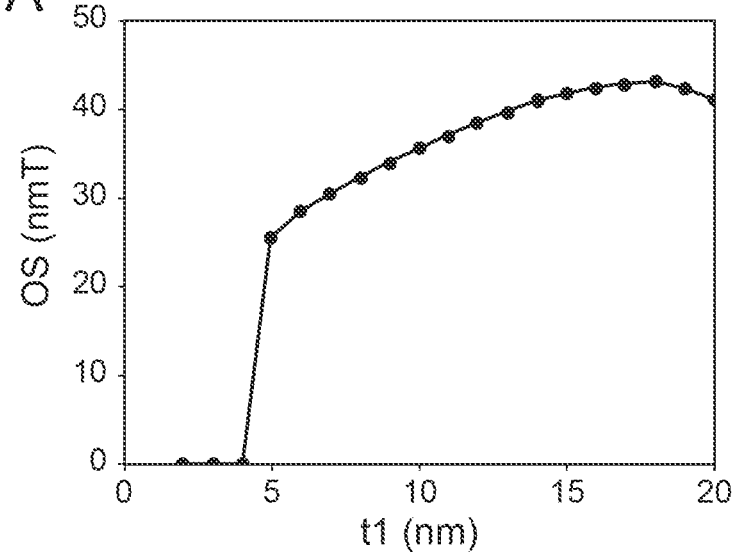
FIGS. 4A and 4B are graph views illustrating characteristics of the magnetic head.
Figure 4B:
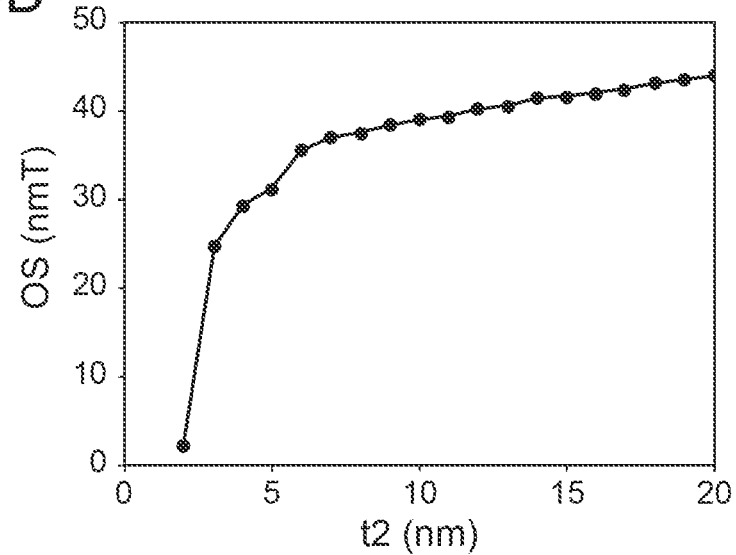

FIGS. 4A and 4B are graph views illustrating characteristics of the magnetic head.

The horizontal axis of FIG. 4A is the first thickness t1. In FIG. 4A, the second thickness t2 is 15 nm. The horizontal axis of FIG. 4B is the second thickness t2. In FIG. 4B, the first thickness t1 is 15 nm. In FIGS. 4A and 4B, the current is supplied to the stacked body 20 is $2.5 \times 10^8$ $A/cm^2$. The vertical axis of FIGS. 4A and 4B is oscillation strength OS.

As shown in FIG. 4A, the first thickness t1 is preferably not less than 5 nm. As a result, the high oscillation strength OS can be obtained. The first thickness t1 may be, for example, not more than 20 nm. For example, the distance between the first magnetic pole 31 and the second magnetic pole 32 (for example, a recording gap) can be shortened. For example, it is easy to obtain a high recording density.

As shown in FIG. 4B, the second thickness t2 is preferably not less than 5 nm. As a result, the high oscillation strength OS can be obtained. The second thickness t2 may be not more than 20 nm. For example, the recording gap can be shortened. For example, it is easy to obtain a high recording density.

Figure 5:
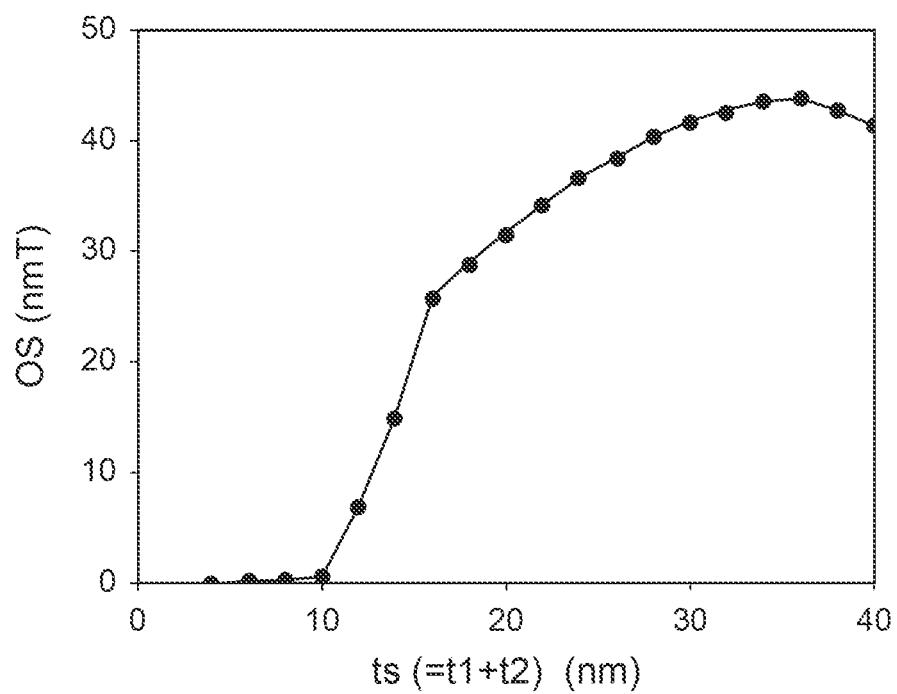
FIG. 5 is a graph view illustrating characteristics of the magnetic head.

FIG. 5 is a graph view illustrating characteristics of the magnetic head.

The horizontal axis of FIG. 5 is a sum ts of the first thickness t1 and the second thickness t2. The vertical axis is oscillation strength OS.

As shown in FIG. 5, the sum ts of the first thickness t1 and the second thickness t2 is preferably not less than 15 nm. As a result, high oscillation strength OS can be obtained. The sum ts may be not more than 40 nm. For example, the recording gap can be shortened. For example, it is easy to obtain a high recording density.

Figure 6A:
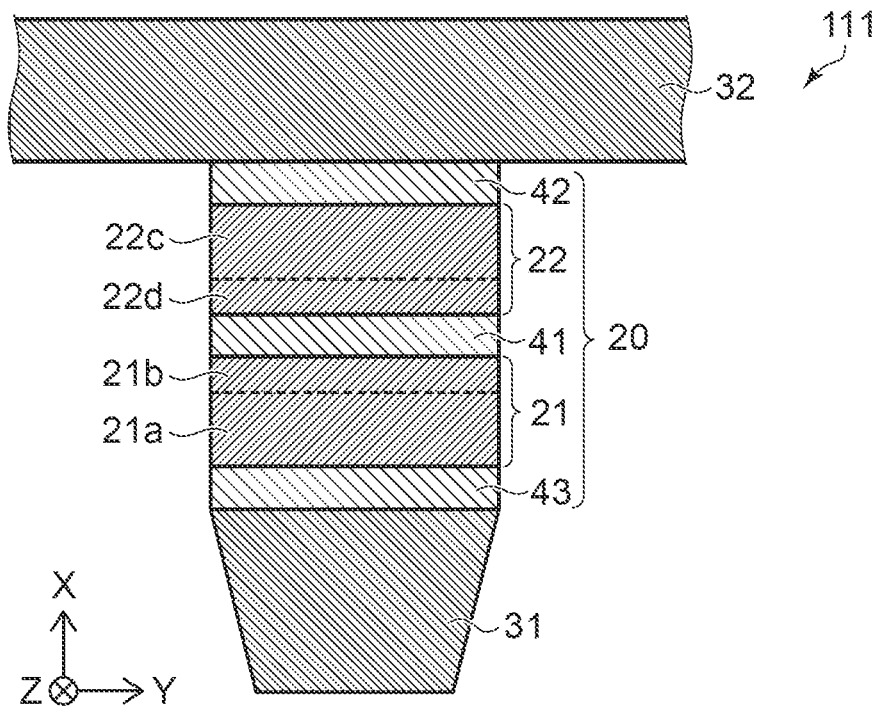
FIGS. 6A and 6B are schematic plan views illustrating the magnetic head according to the first embodiment.
Figure 6B:
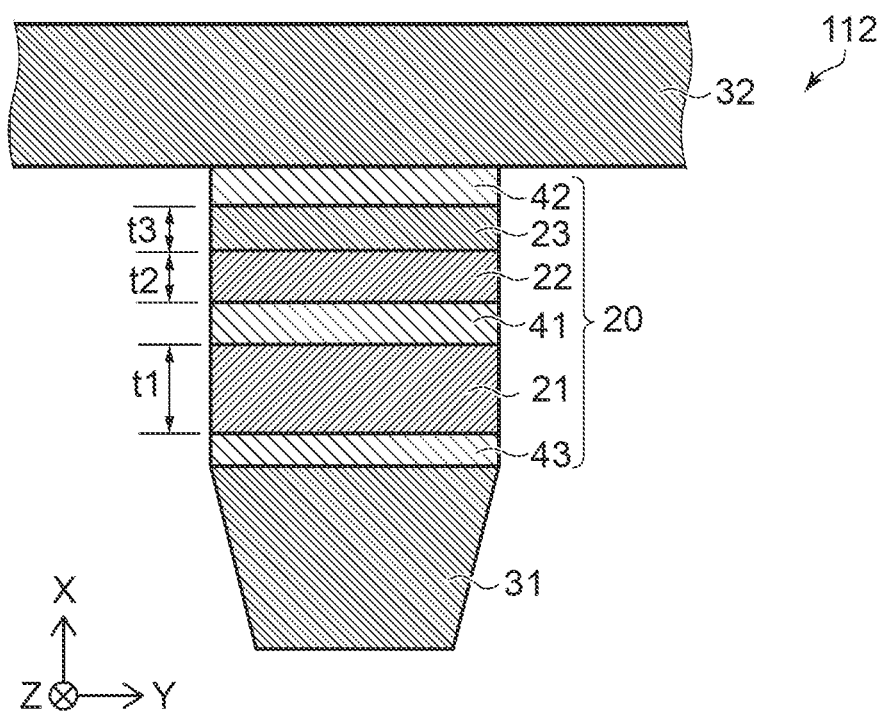

FIGS. 6A and 6B are schematic plan views illustrating the magnetic head according to the first embodiment.

As shown in FIG. 6A, a magnetic head 111 according to the embodiment includes the first magnetic pole 31, the second magnetic pole 32, and the stacked body 20. Also in the magnetic head 111, the stacked body 20 includes the first magnetic layer 21, the second magnetic layer 22, the first non-magnetic layer 41, the second non-magnetic layer 42, and the third non-magnetic layer 43. In the magnetic head 111, at least one of the first magnetic layer 21 or the second magnetic layer 22 includes multiple regions. Other configurations of the magnetic head 111 may be the same as those of the magnetic head 110.

For example, the first magnetic layer 21 includes a first magnetic region 21a and a second magnetic region 21b. The second magnetic region 21b is between the first magnetic region 21a and the first non-magnetic layer 41. For example, saturation magnetization of the first magnetic region 21a is larger than saturation magnetization of the second magnetic region 21b. This makes it easy to obtain stable oscillation, for example.

For example, the saturation magnetization of the first magnetic region 21a is not less than 1.2 times the saturation magnetization of the second magnetic region 21b. As a result, stable oscillation can be easily obtained. The saturation magnetization of the first magnetic region 21a may be not more than 3 times the saturation magnetization of the second magnetic region 21b. As a result, stable oscillation can be easily obtained.

For example, a concentration of Fe in the first magnetic region 21a is higher than a concentration of Fe in the second magnetic region 21b. For example, the saturation magnetization of the first magnetic region 21a tends to be larger than the saturation magnetization of the second magnetic region 21b. For example, a concentration of Ni in the first magnetic region 21a is lower than a concentration of Ni in the second magnetic region 21b. As a result, for example, the saturation magnetization of the first magnetic region 21a tends to be larger than the saturation magnetization of the second magnetic region 21b. The boundary between the first magnetic region 21a and the second magnetic region 21b may be clear or unclear.

For example, the second magnetic layer 22 includes a third magnetic region 22c and a fourth magnetic region 22d. The fourth magnetic region 22d is between the third magnetic region 22c and the first non-magnetic layer 41. For example, saturation magnetization of the third magnetic region 22c is larger than saturation magnetization of the fourth magnetic region 22d. This makes it easy to obtain stable oscillation, for example.

For example, the saturation magnetization of the third magnetic region 22c is not less than 1.2 times the saturation magnetization of the fourth magnetic region 22d. This makes it easy to obtain stable oscillation. The saturation magnetization of the third magnetic region 22c may be not more than 3 times the saturation magnetization of the fourth magnetic region 22d. This makes it easy to obtain stable oscillation.

For example, a concentration of Fe in the third magnetic region 22c is higher than a concentration of Fe in the fourth magnetic region 22d. As a result, for example, the saturation magnetization of the third magnetic region 22c tends to be larger than the saturation magnetization of the fourth magnetic region 22d. For example, a concentration of the second element in the third magnetic region 22c is lower than a concentration of the second element in the fourth magnetic region 22d. As a result, for example, the saturation magnetization of the third magnetic region 22c tends to be larger than the saturation magnetization of the fourth magnetic region 22d. The boundary between the third magnetic region 22c and the fourth magnetic region 22d may be clear or unclear.

As shown in FIG. 6B, a magnetic head 112 according to the embodiment includes the first magnetic pole 31, the second magnetic pole 32, and the stack body 20. In the magnetic head 112, the stacked body 20 includes a third magnetic layer 23 in addition to the first magnetic layer 21, the second magnetic layer 22, the first non-magnetic layer 41, the second non-magnetic layer 42, and the third non-magnetic layer 43. Other configurations of the magnetic head 112 may be the same as those of the magnetic head 110 or the magnetic head 111.

The third magnetic layer 23 is provided between the second magnetic layer 22 and the second non-magnetic layer 42. The third magnetic layer 23 includes the first element including at least one of Fe, Co, or Ni. The third magnetic layer 23 does not include the second element. Or, a concentration of the second element in the third magnetic layer 23 is lower than a concentration of the second element in the second magnetic layer 22. As described above, the second element includes at least one selected from the group consisting of Cr, V, Mn, Ti, and Sc.

For example, saturation magnetization of the third magnetic layer 23 is higher than saturation magnetization of the second magnetic layer 22. This makes it easy to obtain stable oscillation, for example. The boundary between the third magnetic layer 23 and the first magnetic layer 21 may be clear or unclear. The third magnetic layer 23 may be continuous with the second magnetic layer 22.

In the magnetic head 112, the first thickness t1 of the first magnetic layer 21 is, for example, not less than 0.8 times and not more than 1.25 times a sum of the third thickness t3 of the third magnetic layer 23 along the first direction (direction from the first magnetic pole 31 toward the second magnetic pole 32) and the second thickness t2 of the second magnetic layer 22. For example, high oscillation strength OS can be obtained. Stable oscillation can be obtained.

Figure 7A:
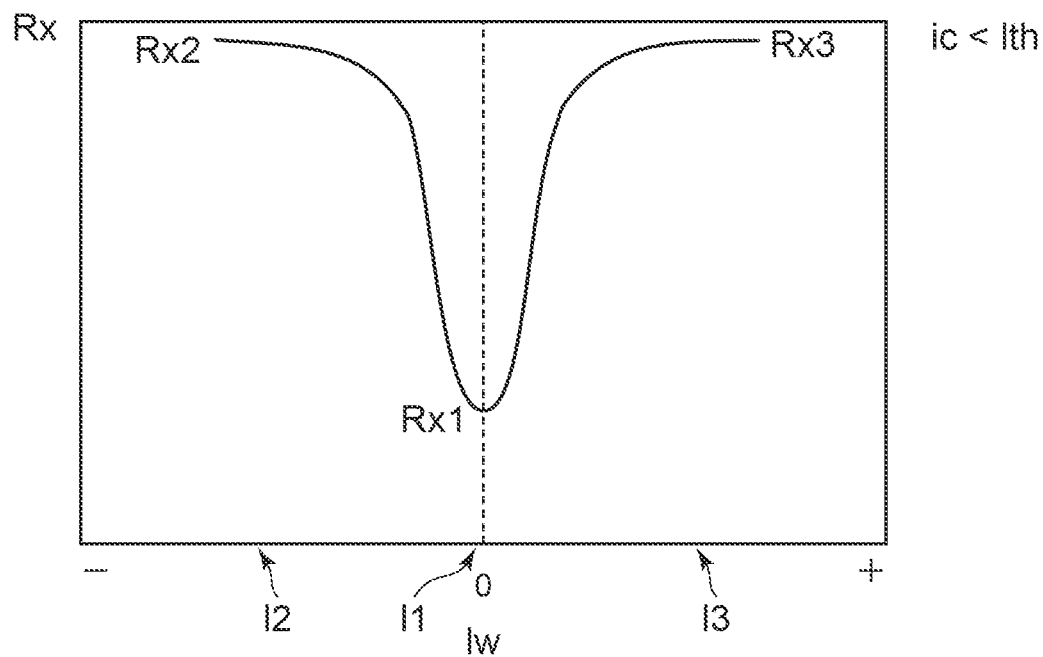
FIGS. 7A and 7B are schematic views illustrating characteristics of the magnetic head according to the embodiment.
Figure 7B:
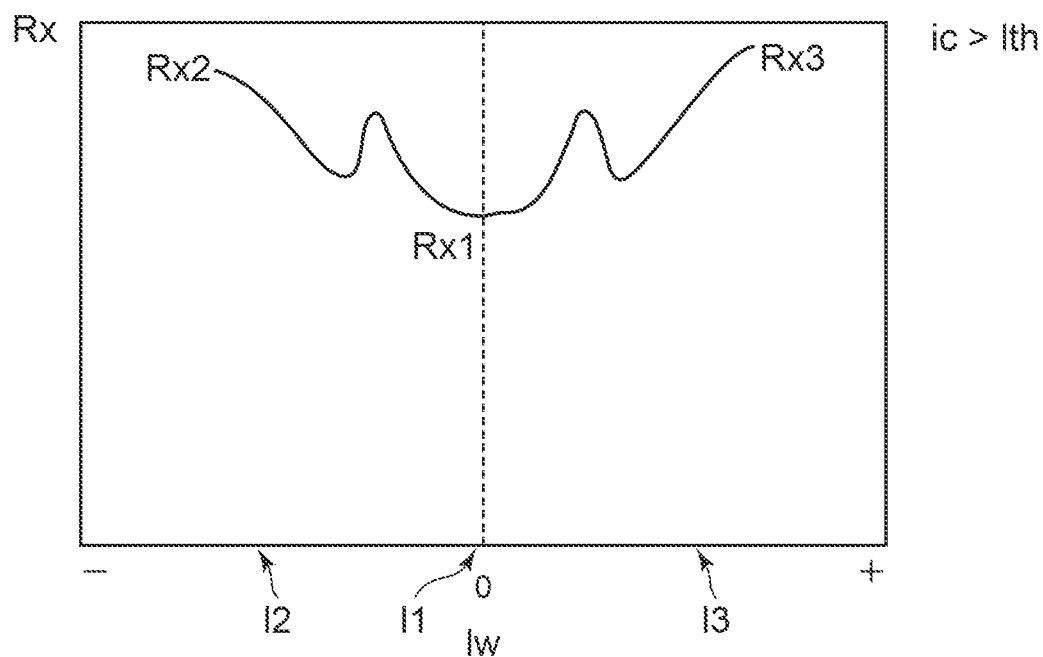

FIGS. 7A and 7B are schematic views illustrating characteristics of the magnetic head according to the embodiment.

The horizontal axis of FIGS. 7A and 7B is the recording current Iw flowing through the coil 30c. The recording magnetic field generated from at least one of the first magnetic pole 31 or the second magnetic pole 32 changes according to the recording current Iw flowing through the coil 30c. The recording magnetic field is applied to the stacked body 20. Therefore, the horizontal axis corresponds to the magnetic field applied to the stacked body 20. The vertical axis of FIGS. 7A and 7B is an electrical resistance Rx of the stacked body 20.

In FIG. 7A, the current ic supplied to the stacked body 20 is smaller than a threshold current Ith of oscillation. In the example of FIG. 7A, the current ic is, for example, $1.0 \times 10^6$ $A/cm^2$. In FIG. 7B, the current ic supplied to the stacked body 20 is larger than the threshold current Ith. In the example of FIG. 7B, the current ic is $1.0 \times 10^8$ $A/cm^2$. The current ic in FIG. 7B is 100 times the current ic in FIG. 7A. FIG. 7A corresponds to characteristics in the non-oscillating state. FIG. 7B corresponds to characteristics in the oscillating state. These figures illustrate characteristics of the temporal average value of the electrical resistance Rx. When the stacked body 20 is oscillating, the electrical resistance Rx changes with the oscillation. A temporal average resistance is adopted as the electrical resistance Rx. The time average can also suppress the influence of noise, for example.

As shown in FIG. 7A, in a case where the current ic is sufficiently smaller than the threshold current Ith, the electrical resistance Rx increases as the absolute value of the recording current Iw (that is, the magnetic field) increases. When the absolute value of the recording current Iw is sufficiently large, the electrical resistance Rx is saturated. For example, the recording current Iw when the electrical resistance Rx is saturated is, for example, 50 mA. The magnetic field at this time is about 15,000 Oe.

In the magnetic recording device head according to the embodiment, for example, the characteristics illustrated in FIG. 7A occur. As shown in FIG. 7A, the electrical resistance Rx of the stacked body 20 is a first resistance Rx1 when the recording current Iw is a first current I1. The electrical resistance Rx is a second resistance Rx2 when the recording current Iw is a second current I2. The electrical resistance Rx is a third resistance Rx3 when the recording current Iw is a third current I3. The absolute value of the first current I1 is smaller than the absolute value of the second current I2 and smaller than the absolute value of the third current I3. The direction of the second current I2 is opposite to the direction of the third current I3. The first resistance Rx1 is lower than the second resistance Rx2 and is lower than the third resistance Rx3. For example, a valley-shaped current-resistance characteristic occurs. The first current I1 may be substantially 0.

As shown in FIG. 7B, in a case where the current ic is larger than the threshold current Ith and oscillation occurs, the electric resistance Rx shows the characteristics of peaks and valleys. In this case as well, if the absolute values of the second current I2 and the third current I3 are sufficiently large, it can be regarded as a valley-shaped characteristic. For example, the absolute values of the second current I2 and the third current I3 may be values when the electric resistance Rx is saturated in a case where the current ic is sufficiently smaller than the threshold current Ith. Also in this case, the first resistance Rx1 is lower than the second resistance Rx2 and is lower than the third resistance Rx3. On the other hand, in a general STO, a mountain-shaped characteristic occurs. The valley-shaped characteristics in the embodiment are considered to be specific characteristics depending on the configuration according to the embodiment.

Such specific characteristics may be related to the fact that the first magnetic layer 21 has positive polarization and the second magnetic layer 22 has negative polarization. In such a combination, in a case where the absolute value of the recording current Iw is large (that is, a case where the absolute value of the magnetic field is large), the directions of magnetization of the first magnetic layer 21 and the second magnetic layer 22 are close to parallel to each other, and the resistance is considered to be increasing. In a general STO, each magnetic layer has positive polarization. The resistance decreases when the magnetization directions are close to parallel to each other.

Figure 8:
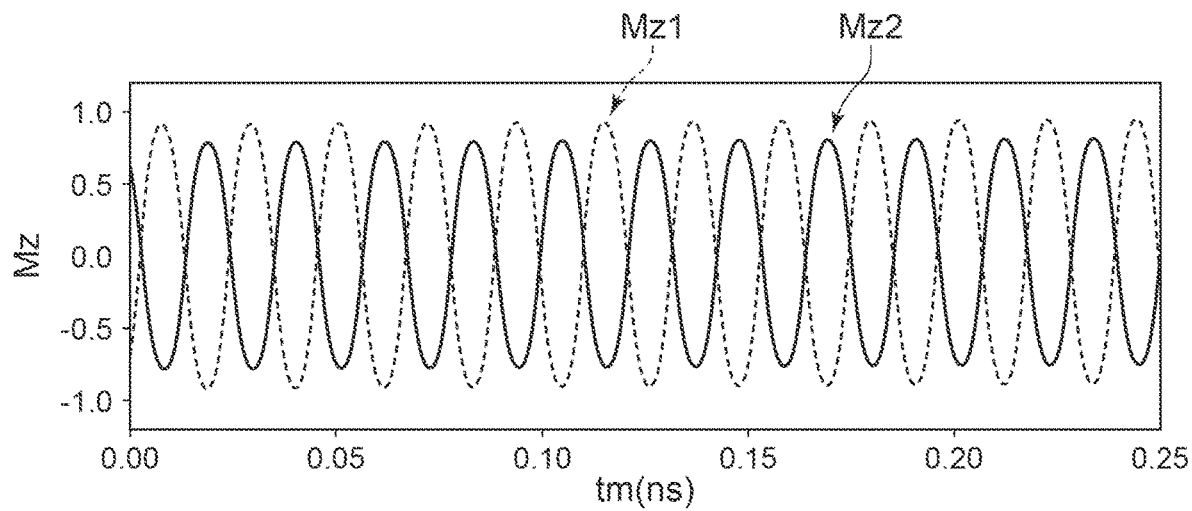
FIG. 8 is a schematic view illustrating characteristics of the magnetic head according to the first embodiment.

FIG. 8 is a schematic view illustrating characteristics of the magnetic head according to the first embodiment.

The horizontal axis in FIG. 8 is a time tm. The vertical axis is magnetization Mz (normalized value). FIG. 8 shows an example relating to magnetization Mz1 of the first magnetic layer 21 and magnetization Mz2 of the second magnetic layer 22. As shown in FIG. 8, the magnetization Mz1 and the magnetization Mz2 rotate in opposite phases (for example, in a state where the opposite directions are kept).

In the following, an example of the magnetic head and the magnetic recording medium 80 included in the magnetic recording device 210 according to the embodiment will be described.

Figure 9:
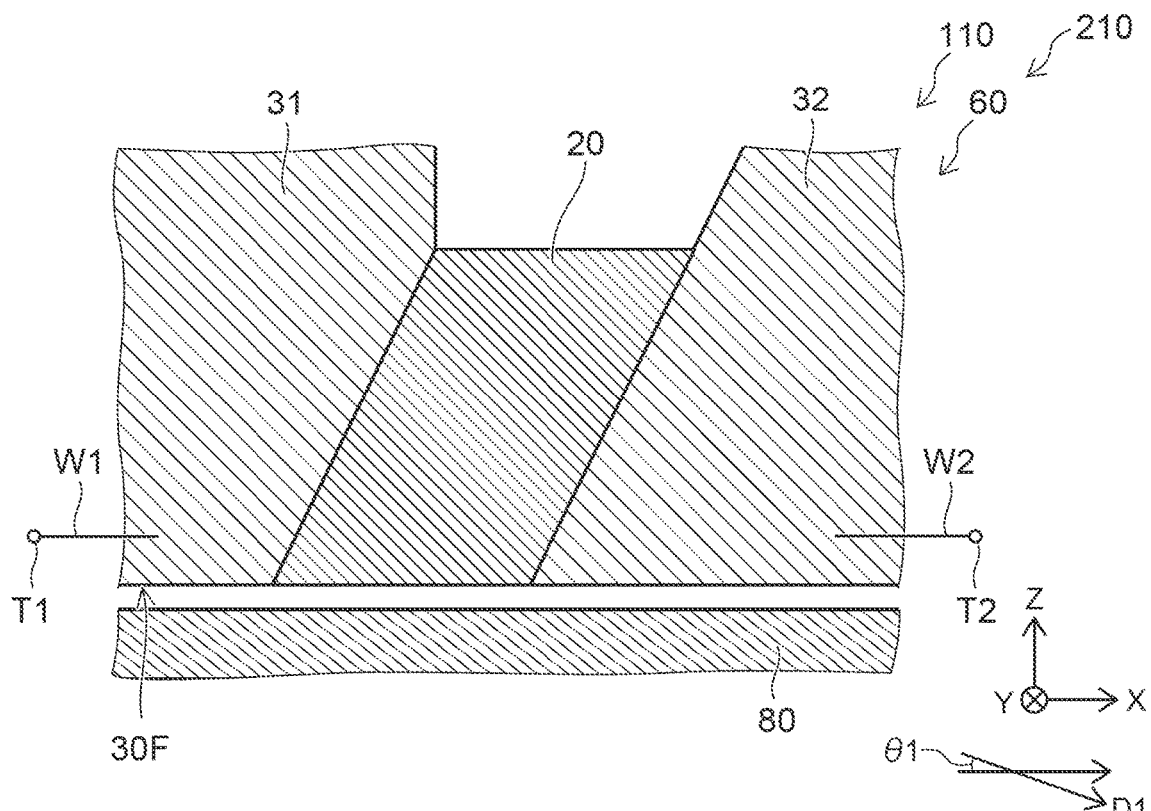
FIG. 9 is a schematic cross-sectional view illustrating the magnetic head according to the embodiment.

FIG. 9 is a schematic cross-sectional view illustrating the magnetic head according to the embodiment.

As shown in FIG. 9, in the magnetic head according to the embodiment (for example, the magnetic head 110), the first direction D1 from the first magnetic pole 31 toward the second magnetic pole 32 may be inclined with respect to the X-axis direction. The first direction D1 corresponds to the stacking direction of the stacked body 20. The X-axis direction is along the medium facing surface 30F. The angle between the first direction D1 and the medium facing surface 30F is taken as an angle θ1. The angle θ1 is, for example, not less than 15 degrees and not more than 30 degrees. The angle Al may be 0 degrees.

When the first direction D1 is inclined with respect to the X-axis direction, the thickness of the layer corresponds to the length along the first direction D1. The configuration in which the first direction D1 is inclined with respect to the X-axis direction may be applied to any magnetic head according to the embodiment. For example, the interface between the first magnetic pole 31 and the laminated body 20 and the interface between the stacked body 20 and the second magnetic pole 32 may be inclined with respect to the X-axis direction.

In the following, an example of the magnetic head and the magnetic recording medium 80 included in the magnetic recording device 210 according to the embodiment will be described.

Figure 10:
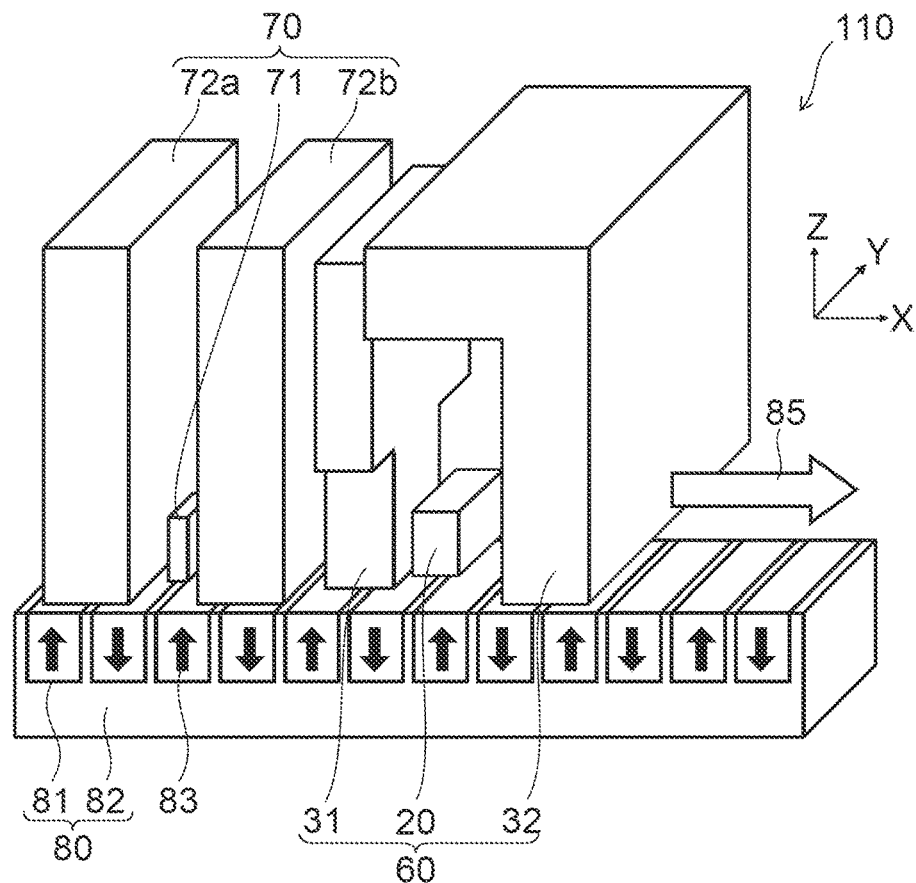
FIG. 10 is a schematic perspective view illustrating the magnetic recording device according to the embodiment.

FIG. 10 is a schematic perspective view illustrating the magnetic recording device according to the embodiment.

As shown in FIG. 10, the magnetic head according to the embodiment (for example, the magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is possible to output a signal corresponding to the magnetization 83 of the magnetic recording layer 81.

As shown in FIG. 10, the magnetic recording medium 80 moves relative to the magnetic head 110 in a direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 11:
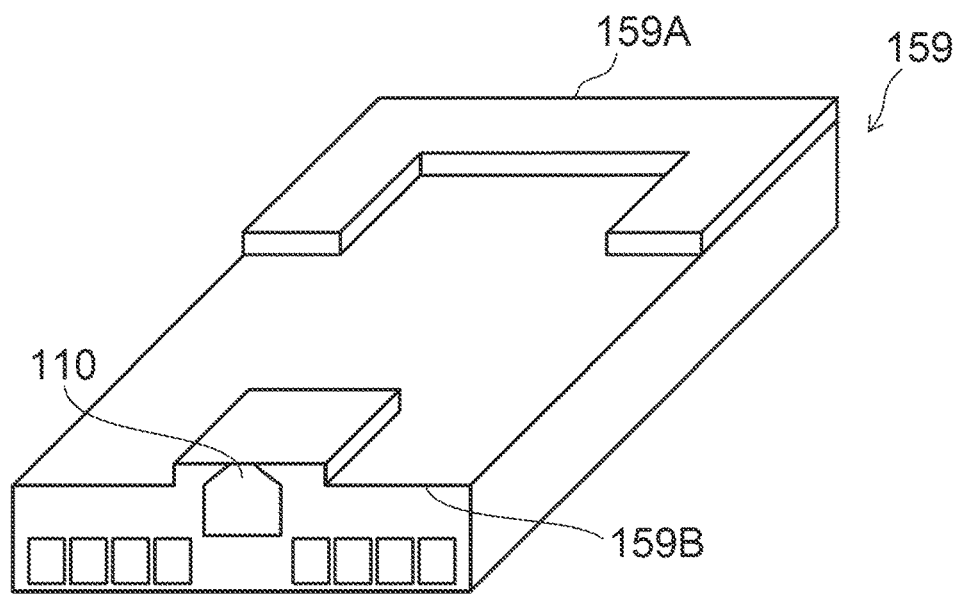
FIG. 11 is a schematic perspective view illustrating a portion of the magnetic recording device according to the embodiment.

FIG. 11 is a schematic perspective view illustrating a portion of the magnetic recording device according to the embodiment.

FIG. 11 illustrates a head slider.

The magnetic head 110 is provided on a head slider 159. The head slider 159 includes, for example, $Al_2O_3$/TiC and the like. The head slider 159 moves relative to the magnetic recording medium while floating or contacting the magnetic recording medium.

The head slider 159 includes, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 12:
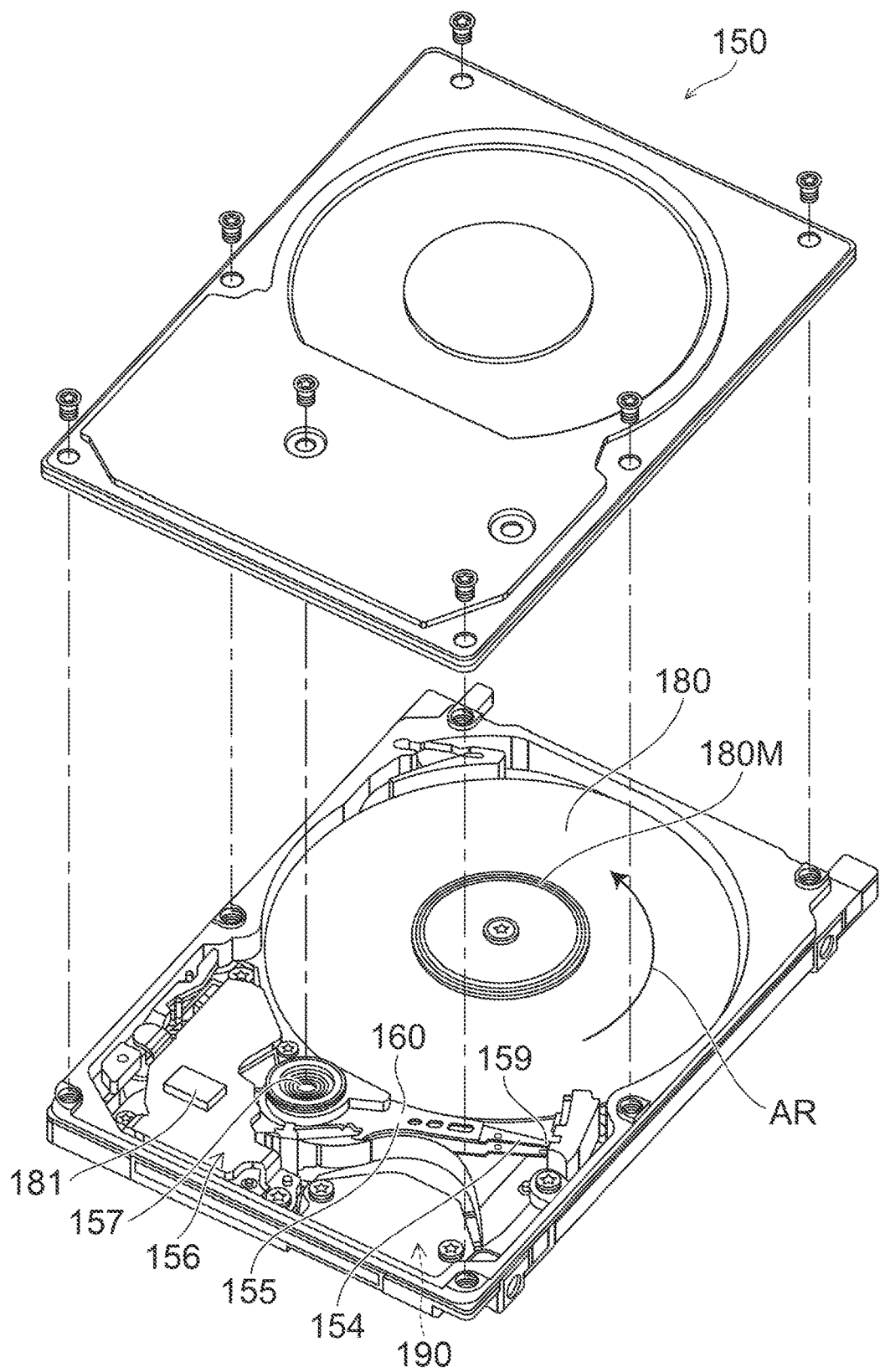
FIG. 12 is a schematic perspective view illustrating a magnetic recording device according to the embodiment.

FIG. 12 is a schematic perspective view illustrating a magnetic recording device according to the embodiment.

As shown in FIG. 12, in the magnetic recording device 150 according to the embodiment, a rotary actuator is used. A recording medium disc 180 is mounted on a spindle motor 180M. The recording medium disc 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disc 180 is a predetermined fly height. In the embodiment, the head slider 159 may contact the recording medium disc 180. For example, a contact-sliding type may be applied.

The suspension 154 is connected to one end of an arm 155 (e.g., an actuator arm). The arm 155 includes, for example, a bobbin portion and the like. The bobbin portion holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 13A:
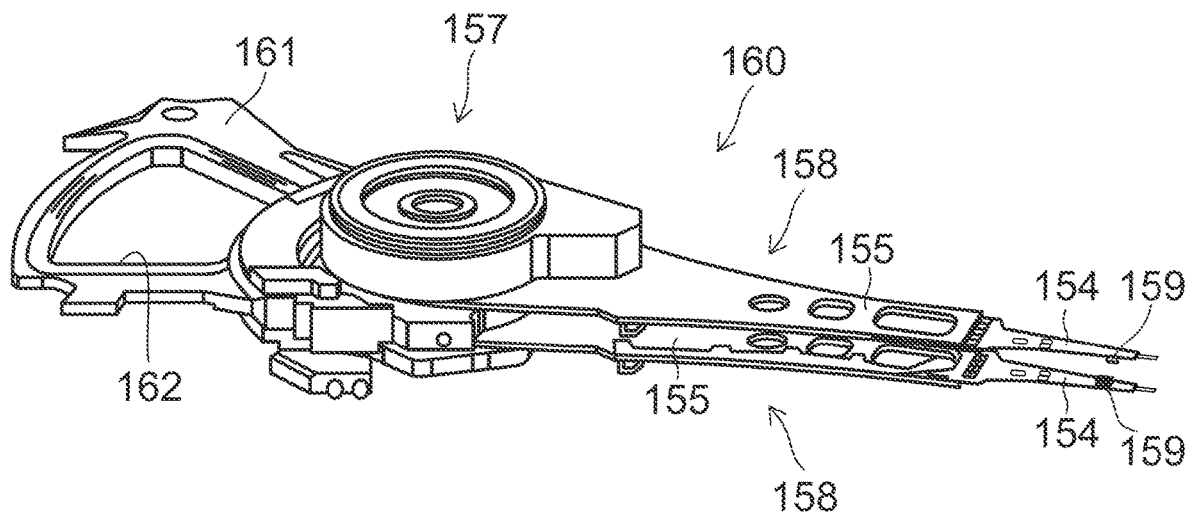
FIGS. 13A and 13B are schematic perspective views illustrating a portion of the magnetic recording device according to the embodiment.
Figure 13B:
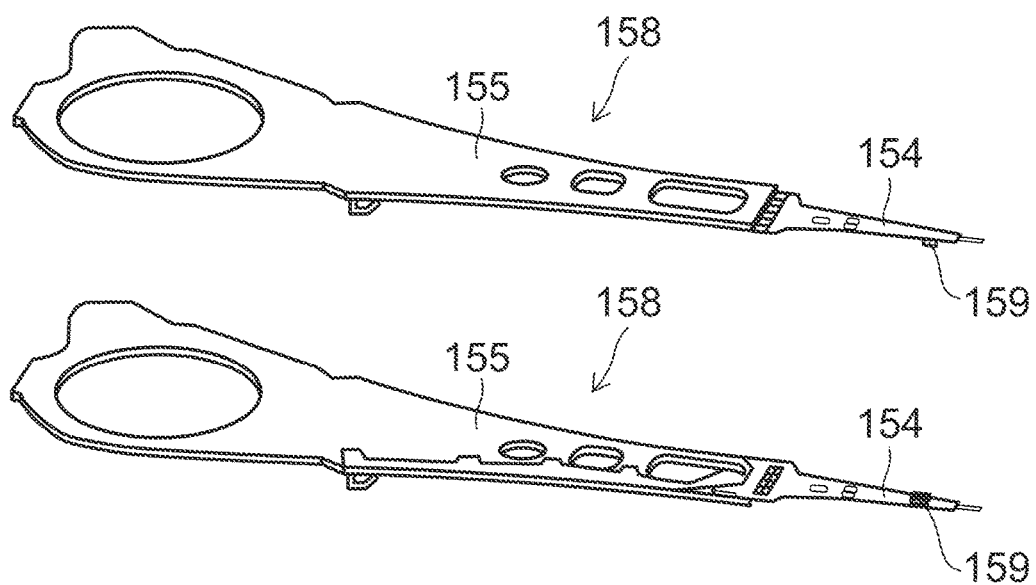

FIGS. 13A and 13B are schematic perspective views illustrating a portion of the magnetic recording device according to the embodiment.

FIG. 13A illustrates a partial configuration of the magnetic recording device and is an enlarged perspective view of a head stack assembly 160. FIG. 13B is a perspective view illustrating a magnetic head assembly (head gimbal assembly: HGA) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 13B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. In the signal processor 190, the input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158.

The embodiment may include the following configurations (e.g., technical proposals).

Configuration 1

A magnetic recording head, comprising:
  a first magnetic pole;
  a second magnetic pole; and
  a stacked body provided between the first magnetic pole and the second magnetic pole,
  the stacked body including
  a first magnetic layer,
  a second magnetic layer provided between the first magnetic layer and the second magnetic pole,
  a first non-magnetic layer provided between the first magnetic layer and the second magnetic layer,
  a second non-magnetic layer provided between the second magnetic layer and the second magnetic pole, and
  a third non-magnetic layer provided between the first magnetic pole and the first magnetic layer,
  the first magnetic layer including a first element including at least one of Fe, Co, or Ni,
  the second magnetic layer including the first element, and a second element including at least one selected from the group consisting of Cr, V, Mn, Ti, and Sc,
  the first magnetic layer not including the second element, or a concentration of the second element in the first magnetic layer being lower than a concentration of the second element in the second magnetic layer, and
  a first thickness of the first magnetic layer along a first direction from the first magnetic pole toward the second magnetic pole being not less than 0.25 times and not more than 4 times a second thickness of the second magnetic layer along the first direction.

Configuration 2

The magnetic head according to Configuration 1, wherein the first thickness is not less than 0.33 times the second thickness.

Configuration 3

The magnetic head according to Configuration 1 or 2, wherein the third non-magnetic layer contacts the first magnetic pole and the first magnetic layer.

Configuration 4

The magnetic head according to one of Configurations 1 to 3, wherein the first non-magnetic layer contacts the first magnetic layer and the second magnetic layer.

Configuration 5

The magnetic head according to one of Configurations 1 to 4, wherein the second non-magnetic layer contacts the second magnetic layer and the second magnetic pole.

Configuration 6

The magnetic head according to Configuration 1, wherein at least one of the first non-magnetic layer, the second non-magnetic layer, or the third non-magnetic layer includes a third element including at least one selected from the group consisting of Cu, Au, Cr, V, Al, or Ag.

Configuration 7

The magnetic head according to one of Configurations 1 to 6, wherein the second thickness is not less than 5 nm.

Configuration 8

The magnetic head according to one of Configurations 1 to 7, wherein the first thickness is not less than 5 nm.

Configuration 9

The magnetic head according to one of Configurations 1 to 8, wherein a sum of the first thickness and the second thickness is not less than 15 nm.

Configuration 10

The magnetic head according to one of Configurations 1 to 9, wherein the first magnetic layer includes a first magnetic region and a second magnetic region, the second magnetic region is between the first magnetic region and the first non-magnetic layer, and saturation magnetization of the first magnetic region is larger than saturation magnetization of the second magnetic region.

Configuration 11

The magnetic head according to one of Configurations 1 to 9, wherein the first magnetic layer includes a first magnetic region and a second magnetic region, the second magnetic region is between the first magnetic region and the first non-magnetic layer, and a concentration of Fe in the first magnetic region is higher than a concentration of Fe in the second magnetic region.

Configuration 12

The magnetic head according to one of Configurations 1 to 11, wherein the second magnetic layer includes a third magnetic region and a fourth magnetic region, the fourth magnetic region is between the third magnetic region and the first non-magnetic layer, and saturation magnetization of the third magnetic region is larger than saturation magnetization of the fourth magnetic region.

Configuration 13

The magnetic head according to one of configurations 1 to 12, wherein the second magnetic layer includes a third magnetic region and a fourth magnetic region, the fourth magnetic region is between the third magnetic region and the first non-magnetic layer, and a concentration of Fe in the third magnetic region is higher than a concentration of Fe in the fourth magnetic region.

Configuration 14

The magnetic head according to one of Configurations 1 to 13, wherein the stacked body further includes a third magnetic layer, the third magnetic layer is provided between the second magnetic layer and the second non-magnetic layer, the third magnetic layer includes a first element including at least one of Fe, Co, or Ni, and the third magnetic layer does not include the second element, or a concentration of the second element in the third magnetic layer is lower than a concentration of the second element in the second magnetic layer.

Configuration 15

The magnetic head according to one of Configurations 1 to 14, wherein a concentration of the second element in the second magnetic layer is not less than 10 atomic % and not more than 80 atomic %.

Configuration 16

The magnetic head according to one of Configurations 1 to 15, wherein a current is supplied to the stacked body in a direction from the first magnetic layer toward the second magnetic layer.

Configuration 17

The magnetic head according to Configurations 16, wherein an alternating magnetic field is generated from the stacked body when the current is supplied to the stacked body.

Configuration 18

The magnetic head according to one of Configurations 1 to 17, further comprising:

a coil, a recording magnetic field generated from at least one of the first magnetic pole or the second magnetic pole changing according to a recording current flowing through the coil, an electrical resistance of the stacked body being a first resistance when the recording current is a first current, the electrical resistance being a second resistance when the recording current is a second current, the electrical resistance being a third resistance when the recording current is a third current, an absolute value of the first current being smaller than an absolute value of the second current, and being smaller than an absolute value of the third current, a direction of the second current being opposite to a direction of the third current, and the first resistance being lower than the second resistance, and being lower than the third resistance.

Configuration 19

A magnetic recording device, comprising:

the magnetic head according to one of Configurations 1 to 16; and an electric circuit, the electric circuit being configured to supply a current to the stacked body, and the current having a direction from the first magnetic layer toward the second magnetic layer.

Configuration 20

The magnetic recording device according to Configuration 19, wherein when the electric circuit supplies a current to the stacked body, an alternating magnetic field is generated from the stacked body.

According to the embodiment, a magnetic head and a magnetic recording device, in which a recording density is possible to be improved, can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording head, comprising:
   a first magnetic pole;
   a second magnetic pole; and
   a stacked body provided between the first magnetic pole and the second magnetic pole,
   the stacked body including
      a first magnetic layer,
      a second magnetic layer provided between the first magnetic layer and the second magnetic pole,
      a first non-magnetic layer provided between the first magnetic layer and the second magnetic layer,
      a second non-magnetic layer provided between the second magnetic layer and the second magnetic pole, and
      a third non-magnetic layer provided between the first magnetic pole and the first magnetic layer,
   the first magnetic layer including a first element including at least one of Fe, Co, or Ni,
   the second magnetic layer including the first element, and a second element including at least one selected from the group consisting of Cr, V, Mn, Ti, and Sc,
   the first magnetic layer not including the second element, or a concentration of the second element in the first magnetic layer being lower than a concentration of the second element in the second magnetic layer, and
   a first thickness of the first magnetic layer along a first direction from the first magnetic pole toward the second magnetic pole being not less than 0.25 times and not more than 4 times a second thickness of the second magnetic layer along the first direction,
   and further comprising an electric circuit configured to generate a current in the stacked body in a direction from the first magnetic layer toward the second magnetic layer.

2. The head according to claim 1, wherein the first thickness is not less than 0.33 times the second thickness.

3. The head according to claim 1, wherein the third non-magnetic layer contacts the first magnetic pole and the first magnetic layer.

4. The head according to claim 1, wherein the first non-magnetic layer contacts the first magnetic layer and the second magnetic layer.

5. The head according to claim 1, wherein the second non-magnetic layer contacts the second magnetic layer and the second magnetic pole.

6. The head according to claim 1, wherein at least one of the first non-magnetic layer, the second non-magnetic layer, or the third non-magnetic layer includes a third element including at least one selected from the group consisting of Cu, Au, Cr, V, Al, or Ag.

7. The head according to claim 1, wherein the second thickness is not less than 5 nm.

8. The head according to claim 1, wherein the first thickness is not less than 5 nm.

9. The head according to claim 1, wherein a sum of the first thickness and the second thickness is not less than 15 nm.

10. The head according to claim 1, wherein
    the first magnetic layer includes a first magnetic region and a second magnetic region,
    the second magnetic region is between the first magnetic region and the first non-magnetic layer, and
    saturation magnetization of the first magnetic region is larger than saturation magnetization of the second magnetic region.

11. The head according to claim 1, wherein
    the first magnetic layer includes a first magnetic region and a second magnetic region,
    the second magnetic region is between the first magnetic region and the first non-magnetic layer, and
    a concentration of Fe in the first magnetic region is higher than a concentration of Fe in the second magnetic region.

12. The head according to claim 1, wherein
    the stacked body further includes a third magnetic layer,
    the third magnetic layer is provided between the second magnetic layer and the second non-magnetic layer, the third magnetic layer includes a first element including at least one of Fe, Co, or Ni, and the third magnetic layer does not include the second element, or a concentration of the second element in the third magnetic layer is lower than a concentration of the second element in the second magnetic layer.

13. The head according to claim 1, wherein a concentration of the second element in the second magnetic layer is not less than 10 atomic % and not more than 80 atomic %.

14. The head according to claim 1, wherein an alternating magnetic field is generated from the stacked body when the current is supplied to the stacked body.

15. A magnetic recording device, comprising: the magnetic head according to claim 1.

16. The device according to claim 15, wherein when the electric circuit supplies the current to the stacked body, an alternating magnetic field is generated from the stacked body.

17. A magnetic recording head, comprising:
a first magnetic pole;
a second magnetic pole; and
a stacked body provided between the first magnetic pole and the second magnetic pole,
the stacked body including
  a first magnetic layer,
  a second magnetic layer provided between the first magnetic layer and the second magnetic pole,
  a first non-magnetic layer provided between the first magnetic layer and the second magnetic layer,
  a second non-magnetic layer provided between the second magnetic layer and the second magnetic pole, and
  a third non-magnetic layer provided between the first magnetic pole and the first magnetic layer,
the first magnetic layer including a first element including at least one of Fe, Co, or Ni,
the second magnetic layer including the first element, and a second element including at least one selected from the group consisting of Cr, V, Mn, Ti, and Sc,
the first magnetic layer not including the second element, or a concentration of the second element in the first magnetic layer being lower than a concentration of the second element in the second magnetic layer, and
a first thickness of the first magnetic layer along a first direction from the first magnetic pole toward the second magnetic pole being not less than 0.25 times and not more than 4 times a second thickness of the second magnetic layer along the first direction,
wherein
the second magnetic layer includes a third magnetic region and a fourth magnetic region,
the fourth magnetic region is between the third magnetic region and the first non-magnetic layer, and
saturation magnetization of the third magnetic region is larger than saturation magnetization of the fourth magnetic region.

18. A magnetic recording head, comprising:
a first magnetic pole;
a second magnetic pole; and
a stacked body provided between the first magnetic pole and the second magnetic pole,
the stacked body including
  a first magnetic layer,
  a second magnetic layer provided between the first magnetic layer and the second magnetic pole,
  a first non-magnetic layer provided between the first magnetic layer and the second magnetic layer,
  a second non-magnetic layer provided between the second magnetic layer and the second magnetic pole, and
  a third non-magnetic layer provided between the first magnetic pole and the first magnetic layer,
the first magnetic layer including a first element including at least one of Fe, Co, or Ni,
the second magnetic layer including the first element, and a second element including at least one selected from the group consisting of Cr, V, Mn, Ti, and Sc,
the first magnetic layer not including the second element, or a concentration of the second element in the first magnetic layer being lower than a concentration of the second element in the second magnetic layer, and
a first thickness of the first magnetic layer along a first direction from the first magnetic pole toward the second magnetic pole being not less than 0.25 times and not more than 4 times a second thickness of the second magnetic layer along the first direction,
wherein
the second magnetic layer includes a third magnetic region and a fourth magnetic region,
the fourth magnetic region is between the third magnetic region and the first non-magnetic layer, and
a concentration of Fe in the third magnetic region is higher than a concentration of Fe in the fourth magnetic region.

19. A magnetic recording head, comprising:
a first magnetic pole;
a second magnetic pole; and
a stacked body provided between the first magnetic pole and the second magnetic pole, and
a coil,
the stacked body including
  a first magnetic layer,
  a second magnetic layer provided between the first magnetic layer and the second magnetic pole,
  a first non-magnetic layer provided between the first magnetic layer and the second magnetic layer,
  a second non-magnetic layer provided between the second magnetic layer and the second magnetic pole, and
  a third non-magnetic layer provided between the first magnetic pole and the first magnetic layer,
the first magnetic layer including a first element including at least one of Fe, Co, or Ni,
the second magnetic layer including the first element, and a second element including at least one selected from the group consisting of Cr, V, Mn, Ti, and Sc,
the first magnetic layer not including the second element, or a concentration of the second element in the first magnetic layer being lower than a concentration of the second element in the second magnetic layer, and
a first thickness of the first magnetic layer along a first direction from the first magnetic pole toward the second magnetic pole being not less than 0.25 times and not more than 4 times a second thickness of the second magnetic layer along the first direction,
a recording magnetic field generated from at least one of the first magnetic pole or the second magnetic pole changing according to a recording current flowing through the coil,
an electrical resistance of the stacked body being a first resistance when the recording current is a first current, the electrical resistance being a second resistance when the recording current is a second current, the electrical resistance being a third resistance when the recording current is a third current, an absolute value of the first current being smaller than an absolute value of the second current, and being smaller than an absolute value of the third current, a direction of the second current being opposite to a direction of the third current, and the first resistance being lower than the second resistance, and being lower than the third resistance.

20. A magnetic recording device, comprising:

a magnetic recording head; and an electric circuit;

wherein the magnetic recording head comprises:
- a first magnetic pole;
- a second magnetic pole; and
- a stacked body provided between the first magnetic pole and the second magnetic pole,
- the stacked body including
  - a first magnetic layer,
  - a second magnetic layer provided between the first magnetic layer and the second magnetic pole,
  - a first non-magnetic layer provided between the first magnetic layer and the second magnetic layer,
  - a second non-magnetic layer provided between the second magnetic layer and the second magnetic pole, and
  - a third non-magnetic layer provided between the first magnetic pole and the first magnetic layer,
- the first magnetic layer including a first element including at least one of Fe, Co, or Ni,
- the second magnetic layer including the first element, and a second element including at least one selected from the group consisting of Cr, V, Mn, Ti, and Sc,
- the first magnetic layer not including the second element, or a concentration of the second element in the first magnetic layer being lower than a concentration of the second element in the second magnetic layer, and
- a first thickness of the first magnetic layer along a first direction from the first magnetic pole toward the second magnetic pole being not less than 0.25 times and not more than 4 times a second thickness of the second magnetic layer along the first direction; and the electric circuit configured to generate a current in the stacked body in a direction from the first magnetic layer toward the second magnetic layer.

* * * * *